Figure 1:
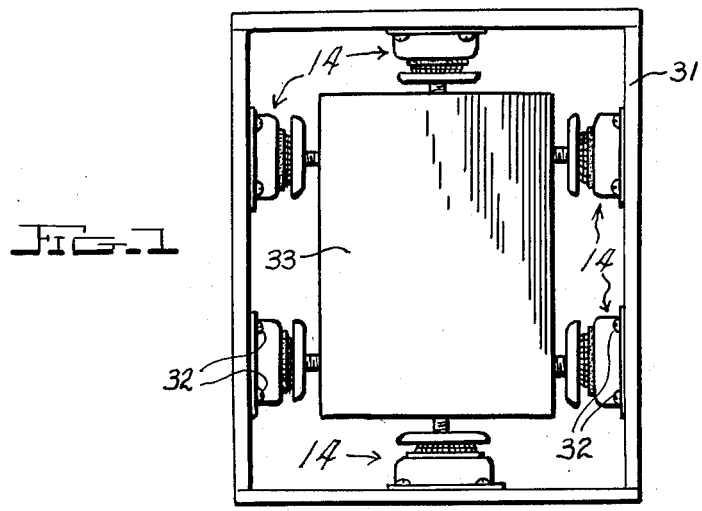

Jan. 6, 1959  K. W. JOHNSON  2,867,434
VIBRATION DAMPENER

Filed March 28, 1957  2 Sheets-Sheet 1

INVENTOR
KENNETH W. JOHNSON,
BY
ATTORNEY

Jan. 6, 1959   K. W. JOHNSON   2,867,434
VIBRATION DAMPENER
Filed March 28, 1957   2 Sheets-Sheet 2
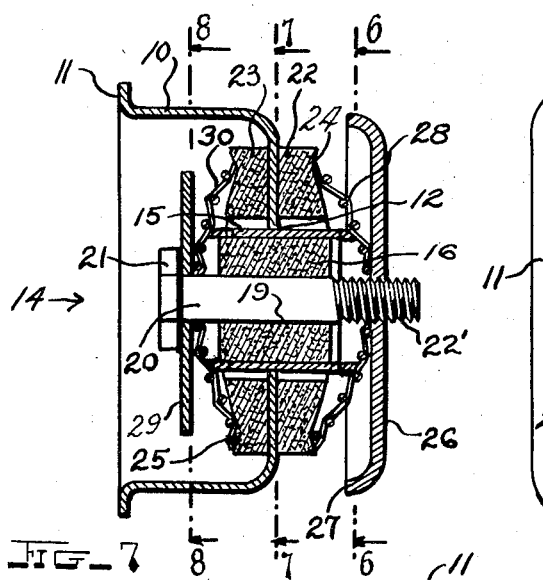
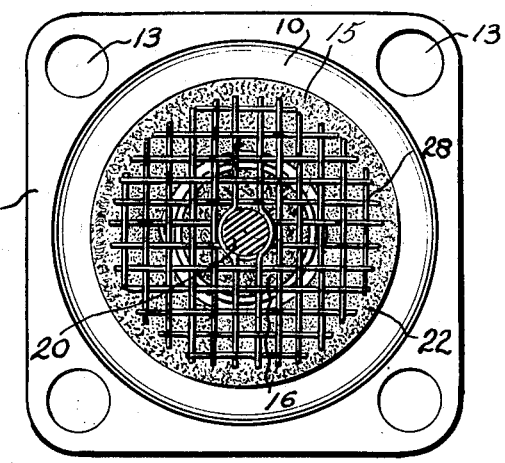
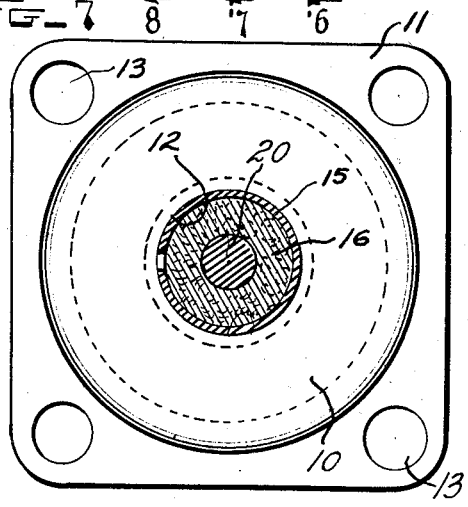
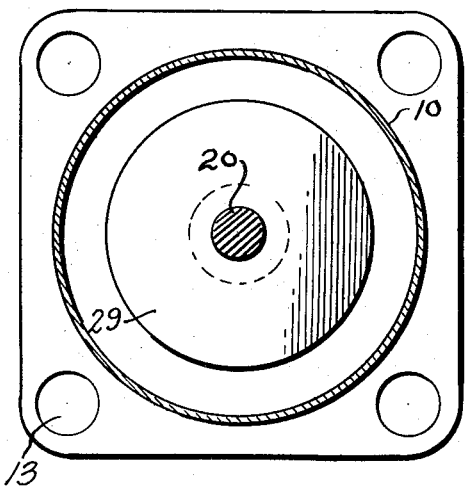
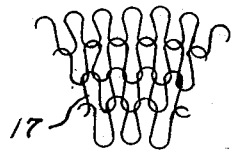
INVENTOR
KENNETH W. JOHNSON,
BY
ATTORNEY United States Patent Office 2,867,434
Patented Jan. 6, 1959

2,867,434

VIBRATION DAMPENER

Kenneth W. Johnson, Dayton, Ohio

Application March 28, 1957, Serial No. 649,252

6 Claims. (Cl. 267—1)

The present invention relates to a vibration dampener and it consists in the combinations, constructions and arrangements of parts herein described and claimed.

Generally there is provided an upper cap and a lower cap centrally through which extends an anchoring bolt, an opening being provided for the snug reception of the bolt in the upper cap and a relatively larger opening being provided for the bolt in the lower cap. A concavo-convex spring-type element of wire screen material or other suitable material presenting its concave face downwardly surrounds the bolt in a position adjacent the upper cap while a like spring element surrounds the bolt adjacent the lower cap and presents its concave face upwardly. Centrally disposed upon the bolt between the two spring elements is a cylindrical member of compressible material such as knitted wire mesh, rubber or the like and surrounding this cylindrical member is a flat cylindrical spring. The ends of the cylindrical cushioning member and the wire spring bear against the inner faces of the wire mesh elements. A metal plate is centrally provided with a relatively large opening through which the bolt, the cylindrical element and the flat cylindrical spring extend and this plate has mounted on each of its upper and lower faces a ring of yieldable material such as knitted wire mesh, rubber or the like, each of the rings being provided upon its outer face with an annular groove for the reception of the marginal edge portion of the concavo-convex element adjacent thereto. The device is so designed as to absorb shock and at the same time dampen or isolate vibration while at the same also providing means for supporting and dampening a load even when the anchoring member is moved at an angle to its normal position. The device may be used in multiples to support, for example, a load inside a packing box or the like or may be used singly in conjunction with a load.

It is accordingly an object of the invention to provide a device of the character set forth which is simple in construction, inexpensive to manufacture and yet effective and efficient in use.

Another object of the invention is to the provision of a device of the character set forth which is capable of long life under all climatic and weather conditions.

A further object of the invention is to provide, in a device of the character set forth, novel means for absorbing shock by friction.

Still another object of the invention is to provide, in a device of the character set forth, a novel plate and coacting frictionally engaged rings forming a part of the invention.

A still further object of the invention is to provide a device of the character set forth having a spring system which is operative in a great many directions and which may be positioned at a variety of angles.

A still further object of the invention is to provide a device of the character set forth having springs of different natural frequencies.

Figure 2:
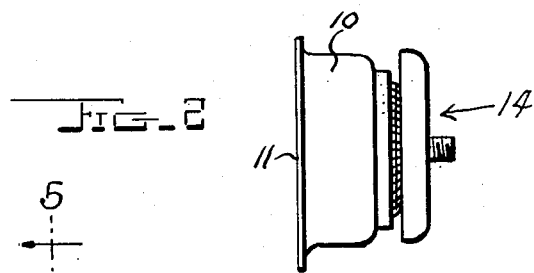
Figures 3, 4:
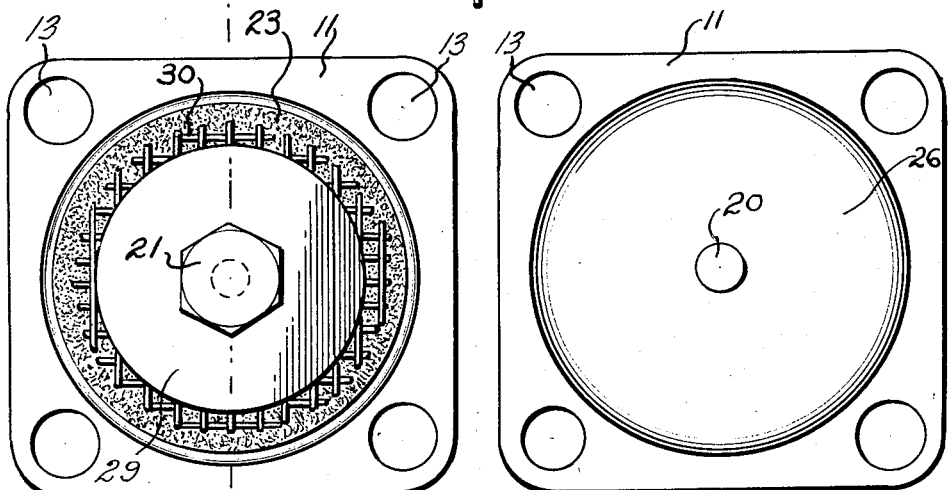

Other and further objects of the invention will become apparent from a reading of the following specification taken in conjunction with the drawings, in which:

Figure 1 is a plan view of a supporting structure illustrating a plurality of the units embodying the present invention, Figure 2 is a somewhat enlarged side elevational view of a device embodying the present invention, Figure 3 is an enlarged bottom plan view of the device shown in Figure 2, Figure 4 is a top plan view of Figure 3, Figure 5 is a sectional view taken along line 5—5 of Figure 3, Figure 6 is a sectional view taken along line 6—6 of Figure 5, Figure 7 is a sectional view taken along line 7—7 of Figure 5, Figure 8 is a sectional view taken along line 8—8 of Figure 5, Figure 9 is a greatly enlarged fragmentary view illustrating the structure of certain wire mesh elements forming a part of the invention, and Figure 10 is a schematic view illustrating further the composition of the aforesaid wire mesh elements.

Referring more particularly to the drawings, there is shown therein a vibration dampener comprising a casing 10 having a substantially square base 11. The casing 10 is centrally provided with an opening 12 and the base 11 is provided in each corner portion thereof with screw or nail-receiving openings 13.

Each if the units is generally designated at 14.

A cylindrical spring 15 formed of flat metal is centrally positioned in the opening 12 and snugly mounted in the spring 15 is a cylindrical block 16 formed of resilient material such as rubber or the like but which in the preferred form is a mass of fine wire mesh such as is illustrated at 17 in Figure 9 and which is folded and refolded upon itself as indicated at 18 in Figure 10.

The cylindrical resilient member 16 is centrally provided with an opening 19 through which extends a bolt 20 having a head 21 at its inner end and which is threaded, as indicated at 22', at its outer end portion.

A pair of annular cushion members, likewise preferably formed of fine wire mesh but which may be composed of other resilient material such as rubber or the like, is indicated at 22 and 23, the former being positioned upon the outer wall of the casing 10 and the latter upon the inner wall of the casing 10 and both concentrically surrounding the opening 12.

A resilient member 22 is provided in its outer face with an annular groove 24 while the member 23 is provided with a like annular groove 25.

A circular cap 26 preferably having an inturned flange 27 is threadably mounted upon the outer end portion of the bolt 20 and a concavo-convex spring element 28 formed of wire screen material or flat spring material surrounds the bolt 20 and presents its convex face against the inner face of the cap 26 while its peripheral edge is engaged in the groove 24.

A washer 29 is mounted upon the bolt 20 immediately inwardly of the head 21 thereof and a concavo-convex spring element 30 of identical size and construction to that of the element 28 likewise surrounds the bolt 20 and presents its convex side against the washer 29 and has its marginal edge positioned in the groove 25.

In the operation of the invention, it will be apparent that in order to mount the same, for example on a packing case 31, or any other support, it is only necessary to affix the same thereto by means of screws 32 or the like, it being understood that the fastening devices will extend through the openings 13 in the base 11. It will now be apparent that the inner end of the bolt 20 may be attached in any suitable manner to a load 33 and that as the load is impressed upwardly or downwardly, the motion of the load will be dampened not only by the compression and expansion of the spring elements 28 and 30 but also by friction between cylindrical spring 15 and the housing or base 11. It will likewise be apparent that the device is capable of dampening shocks which may be received thereby from angles other than the perpendicular since it will be apparent that the device is provided with elements having different natural frequencies and that those elements with higher natural frequencies will absorb shock while those of low natural frequencies will dampen or isolate vibration. During any stress placed upon the device 14, it will likewise be seen that as either of the elements 28 or 30 is compressed, that it will impart a radial expansion movement to its associated element 22 or 23, respectively, while at the same time partially compressing the same, thus introducing frictional shock absorption as well as spring opposition.

While but one form of the invention has been shown and described herein, it will be readily apparent to those skilled in the art that many minor modifications may be made without departing from the spirit of the invention or the scope of the appended claims.

What is claimed is:

1. A device of the character described comprising a casing having an end wall and a centrally disposed opening therein, a base for said casing, means for attaching said base to a supporting structure, an annular resilient member on opposite faces of said end wall of said casing in concentric relation to the opening therein, a cylindrical spring of metal positioned in and extending through said opening, a cylindrical block of resilient material frictionally mounted in said cylindrical spring, a bolt extending centrally through said block, a head for said bolt within said casing, a cap threadably mounted on the outer end of said bolt, a washer mounted on said bolt adjacent said head, a concavo-convex yieldable element surrounding said bolt and presenting its convex face to said washer, and a like concavo-convex element surrounding said bolt and presenting its convex face to said cap, said concavo-convex elements each having their peripheral edges in contact with an adjacent annular resilient member.

2. A device as defined in claim 1 wherein said annular resilient members each is provided with an annular groove for the reception of the peripheral edges of said concavo-convex elements.

3. A device as defined in claim 2 wherein said annular resilient members are formed of fine wire mesh material.

4. A device as defined in claim 2 wherein said cylindrical block is formed of fine wire mesh material.

5. A device as defined in claim 2 wherein said concavo-convex elements are formed of woven wire.

6. A device as defined in claim 1 wherein said annular resilient members and said block are formed of fine wire mesh material folded and refolded upon itself, and wherein said concavo-convex elements are formed of woven wire.

References Cited in the file of this patent

UNITED STATES PATENTS

| | | |
|---|---|---|
| 2,243,660 | Thompson | May 27, 1941 |
| 2,766,163 | Schwartz et al. | Oct. 9, 1956 |